United States Patent Office 2,806,053
Patented Sept. 10, 1957

2,806,053

METHOD OF PRODUCING 2,2-DISUBSTITUTED 1,3-PROPANEDIOL DICARBAMATES

Adolph O. Geiszler, Mundelein, and Marvin A. Spielman, Waukegan, Ill., assignors to Abbott Laboratories, Chicago, Ill., a corporation of Illinois No Drawing. Application June 7, 1956,
Serial No. 589,863

3 Claims. (Cl. 260—482)

This invention relates to an improved method of making dicarbamates and more particularly to an improved method of making 2,2-disubstituted-1,3-propanediol dicarbamates.

It is already known in the art to convert dihydric alcohols to the corresponding dicarbamate derivatives. A preferred method of the prior art consists of low temperature chlorocarbonation of a 2,2-disubstituted-1,3-propanediol in an inert medium in the presence of a tertiary amine, followed by conversion of the bis-chlorocarbonate derivative to the desired dicarbamate. More particularly, the prior art method consists in reacting one mole of a suitable diol with about two moles of phosgene dissolved in toluene at a temperature of −10° C. to 0° C. Antipyrine is used as the tertiary amine acid acceptor in the reaction. The chlorocarbonate is treated with ammonia to form the amide.

The prior art methods leave much to be desired in that they give relatively low yields of impure product, or they require the use of large amounts of solvent and expensive acid acceptors, with attendant higher costs. The prior art processes result in an appreciable amount of an undesirable cyclic product.

It is therefore a principal object of this invention to provide an improved process for making 2,2-disubstituted-1,3-propanediol dicarbamates in high yield of pure product.

It is another object of this invention to provide an improved process for making diol dicarbamates without using an acid acceptor.

Still another object of the invention is to make diol dicarbamates in higher yield and at lower costs, while obtaining smaller amounts of undesirable by-products.

In the accomplishment of the foregoing objects and in accordance with the practice of this invention there is now provided an improvement in the method of making 2,2-disubstituted-1,3-propanediol dicarbamates by reacting one mole of a corresponding diol with about two moles of phosgene in the cold. The improvement consists in dissolving the diol in tetrahydrofuran prior to mixing it with the phosgene. The phosgene may also be dissolved in tetrahydrofuran if desired but in large-scale operations it is satisfactory to use liquid phosgene without added solvent. The reaction mixture obtained in the foregoing reaction is then quenched by bringing it into contact with ammonia, either in the form of ammonia water or as gaseous ammonia. In either event an amount in excess of 4 moles of ammonia per mole of diol is used. The tetrahydrofuran is distilled from the mixture and upon cooling the crystalline dicarbamate precipitates and may be filtered. Temperature control is important and the reaction between the diol and phosgene should take place at low temperatures less than 8° C. and preferably between 0° C. and −10° C. Further details of the reaction will be apparent from a consideration of the examples.

The diols used in the process are well-known products of the prior art. Upon addition of the ammonia to the reaction mixture the desired dicarbamate product is obtained. A small amount of sodium bisulfite removes any color and may be used to insure a white product.

The following examples are presented in order to relate the process in full detail. It is to be understood however that the invention is not intended to be limited in any way by the examples.

*Example I*

Place 40 ml. of tetrahydrofuran in a 500 ml. 3-neck flask fitted with a stirrer, a thermometer and an inlet tube. Tare the flask and contents. Cool in an ice bath. Gas phosgene into the tetrahydrofuran until 89 g. is condensed. Dissolve 52.8 g. of 2-methyl-2-propyl-1,3-propanediol ("diol") in 75 ml. of warm tetrahydrofuran. Add the tetrahydrofuran-"diol" solution to the phosgene-tetrahydrofuran solution at −10° C. to −5° C. over a fifty minute period. Stir the reaction mixture at −7° C. to −4° C. for one hour and then at −4° C. to +2° C. for another hour. Allow the mixture to warm to 8° C. Add the reaction mixture to 240 ml. of 28% aqueous ammonia containing 7 g. of sodium bisulfite, at 8° C. to 15° C. Stir this mixture for ten minutes. Add 100 ml. of water. Heat and distill the tetrahydrofuran until the pot temperature reaches 100–102° C. Add 100 ml. of water. Cool the mixture to 8–10° C. and filter. Dissolve the crude product in 390 ml. of hot 18% aqueous ethanol. Treat with 6 g. of activated charcoal. Filter the hot solution to remove the charcoal. Cool the filtrate to 8–10° C. Collect the crystalline product 2-methyl-2-propyl-1,3-propanediol dicarbamate, and dry in a vacuum oven at 55° C. for twenty to twenty-four hours. The dried material, 82 g. (94%), melts at 104–105.5° C.

*Example II*

Place 85 ml. of tetrahydrofuran and 61 g. of 2-methyl-2-propyl-1,3-propanediol ("diol") in a 500 ml. 3-neck flask fitted with a stirrer, a thermometer, an inlet tube and a manometer. Tare the flask and contents. Cool the mixture to −10° C. in an ice-salt bath. Gas the phosgene under the surface of the mixture until 102 g. is absorbed. Maintain the temperature of the "diol"-tetrahydrofuran mixture at −10° C. to −5° C. during the gasing period. Stir the solution at −5° C. to 0° C. for one hour and then at 0° C. to 5° C. for another hour. Heat the reaction flask and distill the solvent at atmospheric pressure until the pot temperature is 90–95° C. Apply 80–100 mm. vacuum to the hot system to remove the last traces of solvent. Add the crude dichlorocarbamate (128 g.) dropwise to 300 ml. of 28% aqueous ammonia at 8–14° C. Heat the reaction mixture at 45–50° C. for one-half hour. Cool the mixture to 15–18° and filter. Dissolve the crude product in 900 ml. hot 20–25% aqueous isopropanol. Treat with 5 g. of activated charcoal. Filter the hot solution to remove the charcoal. Stir the filtrate vigorously and cool to 8–10° C. Collect the crystalline product 2-methyl-2-propyl-1,3-propane-diol dicarbamate and dry in a vacuum oven at 55° C. for twenty to twenty-four hours. 93 g. (93%) of product is obtained.

*Example III*

Dissolve 61 grams of 2-methyl-2-propyl-1,3-propanediol ("diol") in 90 grams of tetrahydrofuran by warming the solution to 25°–30° C. Charge 40 grams of tetrahydrofuran in a flask, cool the flask in a brine bath and distill into the vessel 102 grams of phosgene. Add the "diol" solution to the phosgene maintaining the temperature below −5° C. After addition is completed, allow the temperature of the mixture to gradually rise to 5° C. over a 2-hour period. Quench the resulting carbonyl chloride in 300 cc. of ammonia water (containing 1 gram of sodium bisulfite), maintaining a temperature below 15° C. Stir the solution for one-half hour, add 100 cc. of water, and distill off the tetrahydrofuran by raising the temperature of the solution to 100–102° C. Cool the slurry to 10° C. and filter off the carbamate. The carbamate is recrystallized from water, 18% ethanol in water, or 25% isopropyl alcohol in water.

Others may practice this invention in any of the numerous ways which will be suggested to one skilled in the art upon a reading of this disclosure. All such practice of the invention is intended to be included hereunder provided it falls within the scope of the appended claims.

We claim:

1. In the process of making 2-methyl-2-propyl-1,3-propanediol dicarbamate by reacting one mole of 2-methyl-2-propyl-1,3-propanediol with about two moles of phosgene in the cold, the improvement which consists in dissolving the 2-methyl-2-propyl-1,3-propanediol in tetrahydrofuran prior to mixing with phosgene.

2. The process of making 2-methyl-2-propyl-1,3-propanediol dicarbamate which comprises dissolving one mole of 2-methyl-2-propyl-1,3-propanediol in tetrahydrofuran and mixing with a cool solution of about two moles of phosgene, neutralizing with ammonia water, removing tetrahydrofuran and recovering the crystalline dicarbamate.

3. The process of making 2-methyl-2-propyl-1,3-propanediol dicarbamate which comprises adding one mole of 2-methyl-2-propyl-1,3-propanediol dissolved in tetrahydrofuran to a cool solution of about two moles of phosgene, maintaining a temperature below about 8° C. in the mixture, adding the mixture to ammonia water containing in excess of 4 moles of ammonia, distilling tetrahydrofuran, cooling and filtering off the crystalline dicarbamate.

No references cited.